Jan. 15, 1952 — C. M. MAYER — 2,582,642
BROILER BURNER AND RADIANT SCREEN FOR GAS COOKING RANGES

Filed May 23, 1950 — 2 SHEETS—SHEET 1

INVENTOR.
Chas. M. Mayer
BY Chas. H. Trotter
Atty.

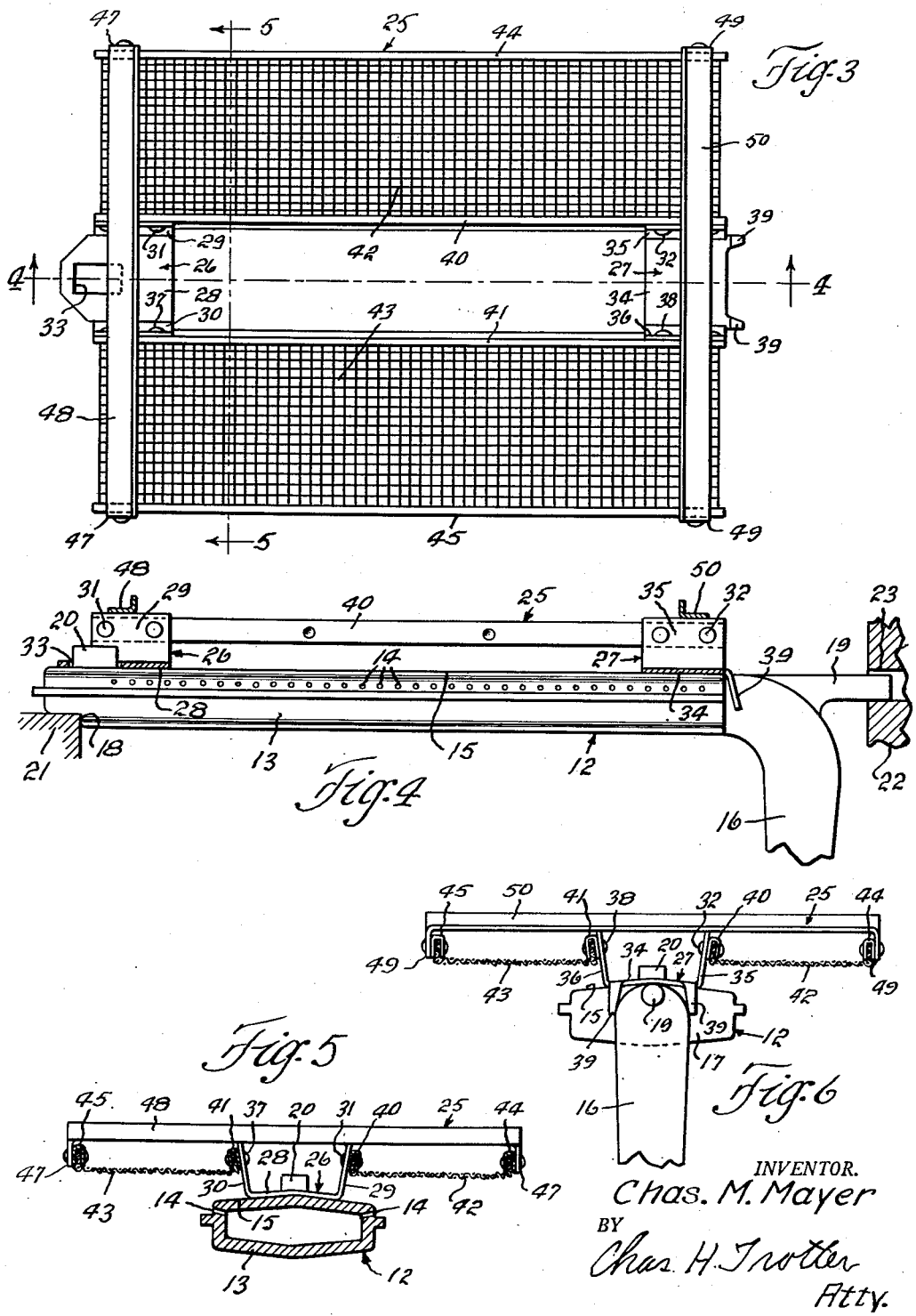

Patented Jan. 15, 1952

2,582,642

UNITED STATES PATENT OFFICE 2,582,642

BROILER BURNER AND RADIANT SCREEN
FOR GAS COOKING RANGES

Charles M. Mayer, Mansfield, Ohio, assignor to
The Tappan Stove Company, Mansfield, Ohio,
a corporation of Ohio Application May 23, 1950, Serial No. 163,765

3 Claims. (Cl. 158—113)

This invention relates generally to broiler burners of cooking ranges using gaseous fuel. More specifically the invention relates to gaseous fuel burners which are used in cooking ranges for both broiling and for heating the oven; and is a modification of the structure shown in my copending application, Serial No. 146,438, filed February 27, 1950, and now abandoned.

In cooking ranges using a single burner for both broiling and baking the broiler compartment is located directly under the oven compartment and the burner is mounted in the upper mid-section of the broiler compartment close to the underside of the thin partition which separates the broiler and oven compartments. In baking or roasting the food is placed in the oven which is heated from the broiler compartment by heated air flowing from the broiler compartment into the oven compartment around the side edges of the partition which separates the two compartments. The side edges of the dividing partition are spaced from the side walls of the compartments to provide passageways for heated air. With this arrangement the heat from the burner is diffused generally throughout the whole broiler compartment. When broiling the food is placed in the broiler compartment beneath the burner and is cooked by the rays of heat which are projected downwardly from the burner flame into contact with the food. In most cooking ranges of this type, which are in use today, it is difficult to properly broil food due to the spreading of the heat from the burner throughout the broiler compartment. It is especially difficult to broil meat so that it is seared and well cooked on the surface and yet is comparatively rare on the inside.

In order to overcome this difficulty I provide means for collecting and concentrating heat from the burner and for projecting concentrated rays of heat downwardly over a selected area. Various different means may be used for this purpose, but I prefer to use a heat resistant wire screen made from nickel chrome alloy wire. One such wire is commercially available under the trade-name "Inconel" and another under the trade-name "Nichrome." I have found that a 10-mesh screen of 24 gauge wire gives excellent results. Broadly this principle is old and I make no claim to the broad idea of the combination of a gaseous fuel burner and a heat collecting and concentrating means which is operative to project concentrated rays of heat downwardly over a selected area. My invention is confined to the construction and arrangement of such a means and the manner of mounting it on a burner.

The principal object of my invention is to provide a simple and efficient mechanism of this character which may be easily and inexpensively manufactured.

Another object of the invention is to provide a device of this character which may be readily applied to burners already in use.

Other and more limited objects of the invention will be apparent from the following specification and the accompanying drawings forming a part thereof wherein:

Fig. 3 is a plan view of my improved heat collecting and concentrating means removed from a burner, the scale of Fig. 3 being the same as the scale of Fig. 2;

Fig. 4 is a central vertical section taken on the line 4—4 of Fig. 3 showing the heat collecting and concentrating means applied to the gaseous fuel burner shown in Figs. 1 and 2, the burner being shown in side elevation;

Fig. 5 is a transverse section taken on the line 5—5 of Fig. 4 and showing the heat collecting and concentrating means applied to a burner shown in transverse section; and Fig. 6 is an elevational view, viewed from the right of Fig. 3, showing the heat collecting and concentrating means applied to a burner which is shown in end elevation.

Figure 1:
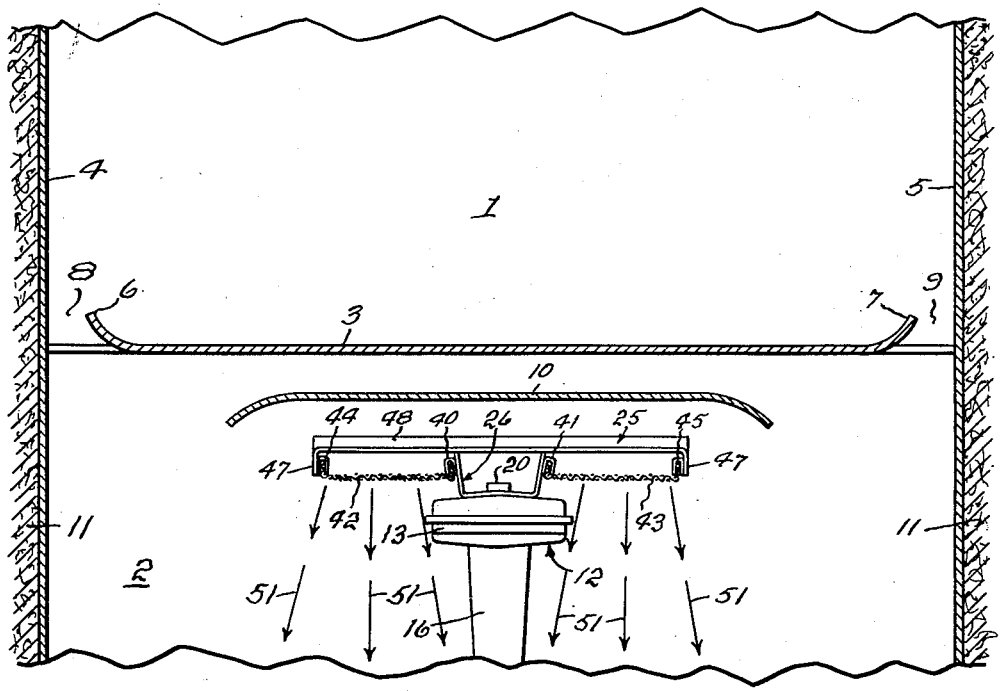
Fig. 1 is a fragmentary vertical section through the lower portion of a cooking range oven and the upper portion of the broiler compartment associated therewith, and showing my invention incorporated therein.
Figure 2:
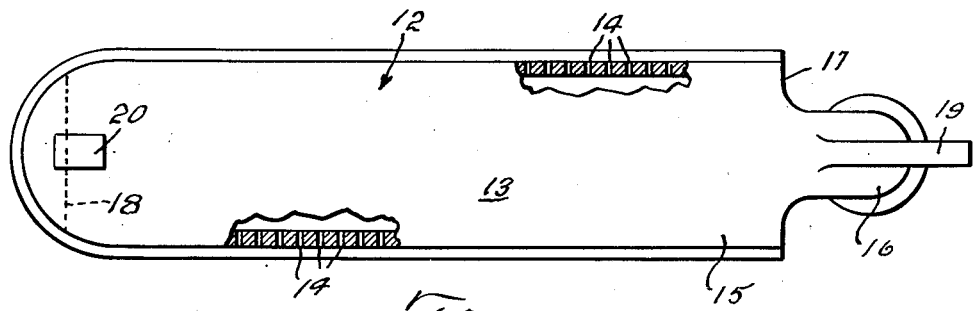
Fig. 2 is a plan view of the gaseous fuel burner shown in front elevation in Fig. 1, the scale of Fig. 2 being slightly larger than the scale of Fig. 1.

Referring now to the drawings, which illustrate one embodiment of my invention, by reference character, the numeral 1 indicates the oven compartment of a cooking range and the numeral 2 the broiler compartment thereof which is located directly below the oven compartment. The oven compartment 1 and the broiler compartment 2 are separated by a thin sheet metal partition 3 which constitutes the bottom of the oven compartment 1 and the top of the broiler compartment 2. The side edges of the partition 3 are turned upwardly and spaced from the side walls 4 and 5, common to both the oven compartment 1 and the broiler compartment 2, as indicated at 6 and 7 to provide passageways 8 and 9 through which heated air may flow from the broiler compartment 2 into the oven compartment 1. A baffle plate 10 is mounted in the broiler compartment 2 slightly below the partition 3 and midway between the walls 4 and 5. The walls 4 and 5 are preferably insulated as indicated at 11. A gaseous fuel burner generally indicated by the numeral 12 is suitably mounted in the upper mid-section of the broiler compartment 2 below the baffle plate 10.

The burner 12 is cast from suitable metal and comprises an elongated chambered body portion 13 having two rows of burner orifices 14, one in each side thereof adjacent the top wall 15 thereof. Gaseous fuel is supplied to the burner through a mixing tube 16 which is formed integrally with the burner body 13 and extends downwardly from the rear end 17 of the body. The underside of the forward end of the burner is shouldered as indicated at 18, and a stud 19 is formed integrally with and extends rearwardly from the upper end of the mixing tube 16. A lug 20 which is formed integrally with and extends upwardly from the mid-section of the forward end of the top 15 of the burner is provided for a purpose to be hereinafter described. The burner is held in position within the broiler compartment 2 by suitable supporting means 21 and 22. The support 21 is disposed adjacent the front of the broiler compartment 2 and engages the shoulder 18. The support 22 which is secured to or formed in the rear wall of the broiler compartment 2 has a recess 23 in which the stud 19 seats.

The heat collecting and concentrating element which is generally indicated by the numeral 25 is removably mounted on the top of the burner 12 under the baffle plate 10. It includes a pair of spaced aligned supports 26 and 27 which are adapted to seat on the top wall 15 of the burner 12, the support 26 at the forward end of the burner and the support 27 at the rear end of the burner. The front support 26 comprises a base 28, shaped to the contour of the top wall 15 of the burner, and a pair of spaced up-turned flanges 29 and 30, one at each side of the base 28. The base 28 has a rectangular aperture 33 therethrough adjacent the forward edge thereof. The rear support 27 comprises a base 34 and a pair of spaced up-turned parallel flanges 35 and 36, one at each side of the base 34. A pair of spaced tongues 39 extend downwardly from the rear edge of the base 34, one at each side thereof. The flanges 29 and 30, and 35 and 36 of the supports 26 and 27 extend upwardly a substantial distance from the bases 28 and 34 as clearly shown in Figs. 4 to 6, inclusive. A relatively long narrow U-shaped sheet metal clamping strip 40 which extends between the flanges 29 and 35 is riveted to the outer surface of the flanges 29 and 35 adjacent the upper edges thereof, as indicated at 31 and 32, with the open edge of the strip at the bottom thereof. A strip 41 similar to the strip 40 is similarly secured to the flanges 30 and 36 as indicated at 37 and 38. A rectangular wire screen 42 has one edge thereof securely clamped between the sides of the strip 40, and a screen 43 similar to the screen 42 has one edge thereof securely clamped between the sides of the strip 41. The screens 42 and 43 extend horizontally outwardly in opposite directions from the strips 42 and 43 in substantially the same plane. The outer edge of the screen 42 is turned upwardly and securely clamped between the sides of a vertically disposed U-shaped narrow sheet metal stiffening strip 44 which extends the full length of the screen 42; and the outer edge of the screen 43 is similarly clamped between the sides of a strip 45 which is similar to the strip 44 and extends the full length of the screen 43. The forward ends of the strips 44 and 45 are riveted to the down turned ends 47 of an elongated angular bracket 48 which rests upon and loosely engages the upper edges of the flanges 29 and 30 of the support 28; and the rear ends of the strips 44 and 45 are riveted to the down turned ends 49 of a bracket 50 which is similar to the bracket 48 and rests upon and loosely engages the upper edges of the flanges 35 and 36 of the support 34. The screens 42 and 43 are preferably 10-mesh screens woven from heat resistant nickel-chrome alloy wire.

When it is desired to broil some food such as a piece of steak or some chops the heat collecting and concentrating element 25 is placed on the top of the burner 12 with the lug 20 extending up through the aperture 33, and the tongues 39 straddling the top of the tube 16 just behind the rear end 17 of the burner. The lug 20 and the tongues 39 thus maintain the element 25 in proper position on the burner 12 as shown during use. In this position the screens 42 and 43 are disposed slightly above the burner 12, one at each side thereof, in position to be heated by the burner. The screens 42 and 43 absorb and collect heat and then radiate concentrated rays of heat downwardly over a selected area as indicated by the arrows 51 in Fig. 1. These concentrated rays are of such high temperature that they will quickly sear and cook the outer surface of the food, sealing in all juices, and allowing a much lesser cooking of the inner body of the food.

When the oven compartment only is used such as for baking or roasting, the element 25 can be easily removed from the burner and stored in a convenient place.

From the foregoing it will be apparent to those skilled in this art that I have provided a very simple and efficient device for accomplishing the objects of my invention, and it is to be understood that I am not limited to the specific construction shown and described herein as various modifications can be made thereto within the scope of the appended claims.

What is claimed is:

1. In a device of the character described the combination of a pair of spaced aligned supporting members each of which has an upwardly extending integral flange at each side thereof, a pair of spaced parallel U-shaped clamping strips extending between said pairs of spaced supporting members and rigidly secured to said flanges adjacent the upper edges thereof, a pair of substantially vertically disposed U-shaped stiffening strips, a pair of wire mesh screens, one edge of each of said screens being clamped between the legs of one of said U-shaped clamping strips, said screens extending outwardly from the lower edges of said clamping strips and having the outer edges thereof turned upwardly, the upturned edge of each of said screens being securely clamped between the legs of one of said substantially vertically disposed U-shaped stiffening strips, and a pair of spaced parallel brackets having down turned ends, one of said brackets resting loosely on the upper edges of the upwardly extending flanges of each of said supporting members, the down turned ends of said brackets being secured to said stiffening strips.

2. In a device of the character described, the combination of a pair of spaced supporting members each of which comprises a base adapted to seat upon a gaseous fuel burner and a pair of upturned integral flanges one at each side thereof, a pair of spaced parallel U-shaped clamping strips rigidly secured to and extending between said supporting members one at each side thereof, a pair of wire mesh screens one edge of one of which is clamped between the legs of one of said clamping strips and extends outwardly from the lower edge thereof and the other of which is securely clamped at one edge between the legs of the other of said clamping strips and extends outwardly from the lower edge thereof, a pair of stiffening strips one secured to the edge of each of said screens opposite said one edge and a pair of supporting brackets operative to hold said screens in fixed position, one of said brackets resting loosely upon the upper edges of the flanges of one of said supporting members and having the outer ends thereof secured to said stiffening strips, and the other of said brackets resting loosely upon the upper edges of the flanges of the other of said supporting members and having the outer ends thereof secured to said stiffening strips.

3. In a device of the character described, the combination of a pair of spaced supporting members each of which comprises a base adapted to seat upon a gaseous fuel burner and a pair of upturned integral flanges one at each side thereof, a pair of spaced parallel elongated strips rigidly secured to and extending between said supporting members one at each side thereof, a pair of wire mesh screens one edge of one of which is secured to one of said strips and extends outwardly from the lower edge thereof and the other of which has one edge secured to the other of said strips and extends outwardly from the lower edge thereof, a pair of stiffening strips one secured to the edge of each of said screens opposite said one edge, and a pair of supporting brackets operative to hold said screens in fixed position, one of said brackets resting loosely upon the upper edges of the flanges of one of said supporting members and having the outer ends thereof secured to said stiffening strips, and the other of said brackets resting loosely upon the upper edges of the flanges of the other of said supporting members and having the outer ends thereof secured to said stiffening strips.

CHARLES M. MAYER.

REFERENCES CITED

The following references are of record in the file of this patent:

UNITED STATES PATENTS

| Number | Name | Date |
|---|---|---|
| 1,404,912 | Tobias | Jan. 31, 1923 |

FOREIGN PATENTS

| Number | Country | Date |
|---|---|---|
| 799,159 | France | Mar. 27, 1936 |
| 520,940 | Great Britain | May 8, 1950 |